(12) United States Patent
Hur et al.

(10) Patent No.: US 9,766,656 B2
(45) Date of Patent: Sep. 19, 2017

(54) APPARATUS AND METHOD FOR MOUNTING PORTABLE TERMINAL

(71) Applicants: Hyundai Motor Company, Seoul (KR); Kia Motors Corporation, Seoul (KR); LG Innotek CO., LTD., Seoul (KR)

(72) Inventors: Nam Woong Hur, Gyeonggi-do (KR); Sin Gu Kim, Gyeonggi-do (KR); Seul Ki Jeon, Jeollabuk-do (KR); Jeong Nam Son, Gyeonggi-do (KR); Woo Kil Jung, Gyeonggi-do (KR); Yun Bok Lee, Seoul (KR); Yong Suk Chae, Gyeonggi-d (KR)

(73) Assignees: Hyundai Motor Company, Seoul (KR); Kia Motors Corporation, Seoul (KR); LG Innotek Co., LTd., Seoul (KR)

( * ) Notice: Subject to any disclaimer, the term of this patent is extended or adjusted under 35 U.S.C. 154(b) by 408 days.

(21) Appl. No.: 14/565,834

(22) Filed: Dec. 10, 2014

(65) Prior Publication Data

US 2016/0062404 A1 Mar. 3, 2016

(30) Foreign Application Priority Data

Aug. 27, 2014 (KR) .......................... 10-2014-0112417

(51) Int. Cl.
*G06F 7/00* (2006.01)
*G05D 1/00* (2006.01)
*G11C 29/00* (2006.01)
*H04N 5/225* (2006.01)
*G06F 1/16* (2006.01)
*H02J 7/02* (2016.01)
*H04M 1/04* (2006.01)

(52) U.S. Cl.
CPC ............ *G06F 1/1632* (2013.01); *H02J 7/025* (2013.01); *H04M 1/04* (2013.01)

(58) Field of Classification Search
None
See application file for complete search history.

(56) References Cited

FOREIGN PATENT DOCUMENTS

| JP | 2014-088092 A | 5/2014 |
| JP | 2014088092 A * | 5/2014 |
| KR | 20-0366679 Y1 | 11/2004 |
| KR | 2020040021983 B1 * | 11/2004 |
| KR | 20-0456789 A | 11/2011 |
| KR | 20-2012-0003702 A | 5/2012 |
| KR | 10-2012-0121688 A | 11/2012 |

* cited by examiner

*Primary Examiner* — Yolanda Cumbess
(74) *Attorney, Agent, or Firm* — Mintz Levin Cohn Ferris Glovsky and Popeo, P.C.; Peter F. Corless

(57) ABSTRACT

An apparatus for mounting a portable terminal is provided and may include a plurality of fixators configured to move in diagonal directions of one surface of the portable terminal and fix corners of the portable terminal. A controller is configured to detect the portable terminal and execute the movement of the fixators so that the fixators closely adhere to the corners of the portable terminal.

15 Claims, 3 Drawing Sheets

APPARATUS AND METHOD FOR MOUNTING PORTABLE TERMINAL

CROSS-REFERENCE TO RELATED APPLICATION

This application claims priority to Korean Patent Application No. 10-2014-0112417 filed on Aug. 27, 2014, the disclosure of which is incorporated herein by reference.

TECHNICAL FIELD

The present disclosure relates to an apparatus for mounting a trunk portable terminal, and more particularly, to an apparatus that mounts a portable terminal and fixes corner portions of the portable terminal.

BACKGROUND

The development of an information communication technology has led to the development and use of portable terminals such as a mobile phone, a personal digital assistant (PDA), a portable multimedia player (PMP), and the like. These portable terminals may be mounted on a cradle configured to hold the portable terminal in place within a vehicle or home.

Since the portable terminal may have various shapes and sizes, a mounting apparatus for the portable terminal also needs various shapes and sizes. When the portable terminal is mounted on the cradle, the mounting apparatus may hold the portable terminal in place by a side surface or an upper/lower surface. Since the cradle may mount a portable terminal of a specific size, when the portable terminal is not the same specific size, the cradle may not be able to hold the portable terminal and may be inconvenient to use.
Further, the portable terminal may have buttons configured to receive a user input. The buttons may be disposed on a side surface or an upper/lower surface thereof. When the portable terminal is fixed into the cradle, the buttons on the side surface or the upper/lower surface may be accidentally engaged and cause unwanted functions to be performed on the portable terminal.

SUMMARY

An aspect of the present disclosure provides an apparatus and method for mounting a portable terminal without accidental engagement of buttons disposed on a side surface or an upper/lower surface of the portable terminal for fixing corner portions of the portable terminal using two pairs of fixators that may move in a diagonal direction.

An exemplary embodiment of the present disclosure provides an apparatus for mounting a portable terminal that may include: a plurality of fixators configured to move in diagonal directions of one surface of the portable terminal and fix corners of the portable terminal; and a controller configured to detect the portable terminal and execute the movement of the fixators to adhere the fixators to the corners of the portable terminal based on the detection of the portable terminal.

The fixators may be four fixators formed by two pairs of fixators. The four fixators may be configured to move individually, or be moved as individual pairs with two fixators connected together to form a pair, or as a group with the four fixators all connected together. The apparatus may further include a plurality of motors configured to move the fixators based on a control of the controller. The fixators may have a cross sectional shape of at least one selected from the group consisting of: a substantially circle shape, a substantially quadrangular shape, and a saw tooth shape. The fixator may be formed of a substantially soft material relative to the portable terminal, and may be individually replaced when the fixator is damaged.

The controller may be further configured to detect the portable terminal by detecting a weight of the portable terminal or using near field communication (NFC). When an NFC identification (ID) of the portable terminal is preregistered with the controller, the controller may be configured to automatically move the fixator to a position to fix the portable terminal. Further, when the controller is connected to a wireless charging system, the controller may be configured to recognize the portable terminal based on a portable terminal response to a signal (e.g., ping) from the wireless charging system.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
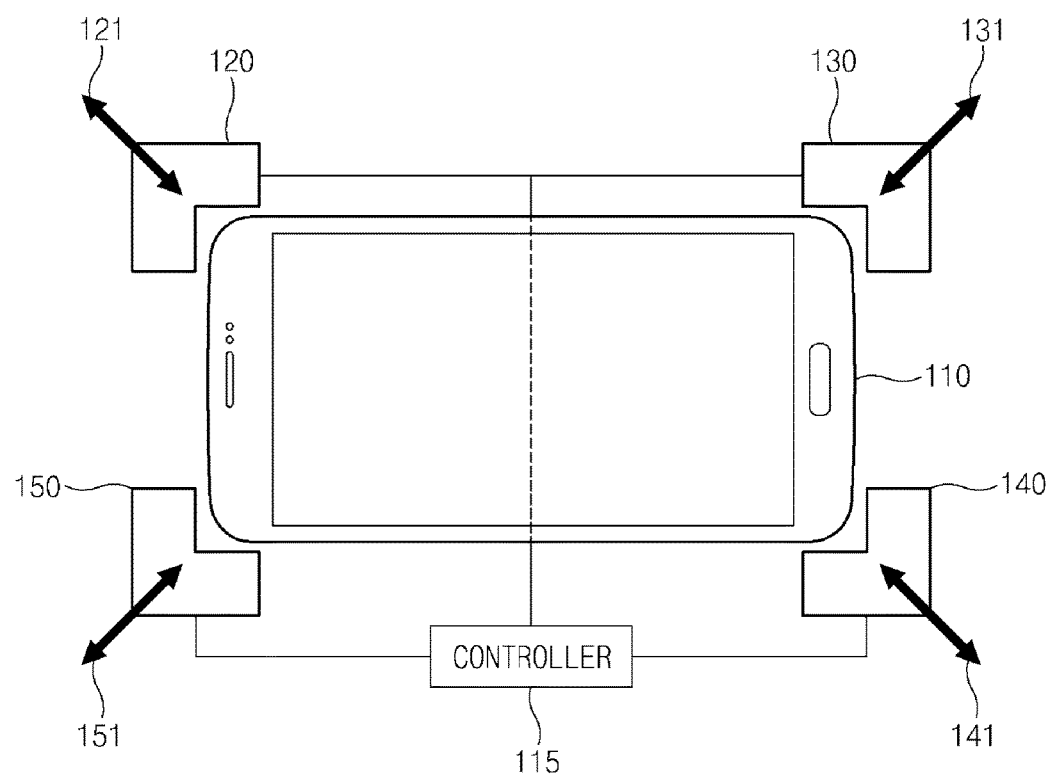
FIG. 1 is an exemplary diagram illustrating an apparatus for mounting a portable terminal according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Advantages and features of the present disclosure and methods to achieve them will be described from exemplary embodiments described below in detail with reference to the accompanying drawings. However, the present disclosure is not limited to the exemplary embodiments set forth herein, but may be modified in many different forms. Merely, the exemplary embodiments of the present disclosure will be provided to describe the spirit of the present disclosure in detail so that those skilled in the art may easily implement the spirit of the present disclosure.

In the drawings, the exemplary embodiments of the present disclosure are not limited to illustrated specific forms, but are exaggerated for clarity. In the present specification, specific terms have been used, but are just used for the purpose of describing the present disclosure and are not used for qualifying the meaning or limiting the scope of the present disclosure, which is disclosed in the appended claims.

Hereinafter, exemplary embodiments of the present disclosure will be described in detail with reference to the accompanying drawings.

FIG. 1 is an exemplary diagram illustrating an apparatus for mounting a portable terminal according to an exemplary embodiment of the present disclosure. Widely used portable terminals (e.g., a smartphone, a tablet personal computer (PC) or the like) generally have a quadrangular shape. Hereinafter, for convenience of explanation, a smartphone that has a quadrangular shape will be described as an example of the portable terminal, and a plurality of fixators will be described as four fixators. However, the portable terminal is not limited to a smartphone but may be applied to any other portable terminal as well. Further, the plurality of fixators is not limited to four fixators.

Fixators 120, 130, 140, and 150 included in the apparatus for mounting the portable terminal may be configured to move in a diagonal direction relative to a movement surface of a smartphone 110. In particular, the movement surface may be a widest surface of the smartphone 110. In other words, the movement surface may be a surface that has a display provided thereon or a surface opposite of the display. In addition, the fixators 120, 130, 140, and 150 may be configured to move in diagonal directions 121, 131, 141, and 151 to adhere each fixator to a corner of the smartphone 110 and to thus fix the smartphone 110.

The apparatus configured to mount a portable terminal may also include a controller 115 configured to detect the smartphone 110. More specifically, the controller 115 may be configured to detect the smartphone 110 and a size of the smartphone 110. The controller 115 may further be configured to detect a weight of the smartphone 110 when the smart phone is placed on the apparatus. Furthermore, when the smartphone 110 includes a module or an application for near field communication (NFC), the controller 115 may be configured to detect the smartphone 110 or the size thereof via the NFC. Additionally, the controller 115 may be configured to store information regarding the recognized smartphone 110 or the size based on the weight thereof within a database.

Further, when an NFC ID of the smartphone 110, detected by the controller 115 via the NFC, is stored within the database within the controller 115, the controller 115 may be configured to detect the smartphone 110 by classifying and specifying the smartphone 110 from other portable terminals and to automatically move the fixators 120, 130, 140, and 150 to particular positions to fix the specified smartphone 110. When the fixators 120, 130, 140, and 150 are not moved to a previously stored position and stop catching the corners of the smartphone 110 while moving, the fixators may be configured to automatically move to a specific position to fix the smartphone 110. In addition, when the controller 115 is connected to a wireless charging system disposed within the vehicle, the controller 115 may be configured to recognize the corresponding smartphone 110 based on a response signal from the smartphone 110 to a signal (e.g., ping) from the wireless charging system.

Figure 2:
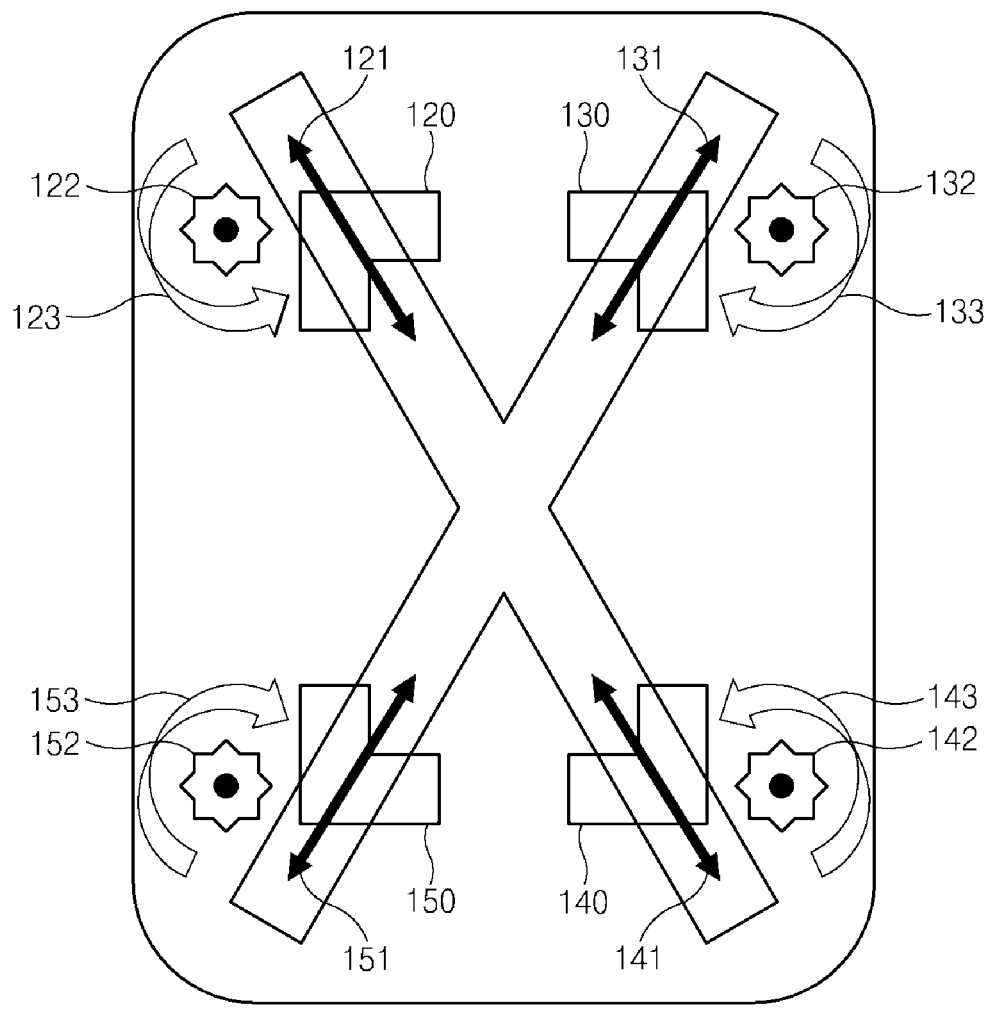
FIG. 2 an exemplary a diagram illustrating a movement of fixators of an apparatus for mounting a portable terminal according to an exemplary embodiment of the present disclosure.

Hereinafter, processes of moving the fixators and fixing the portable terminal will be described in detail with reference to FIG. 2. In particular, FIG. 2 is an exemplary diagram illustrating a movement of fixators of the apparatus for mounting the portable terminal according to an exemplary embodiment of the present disclosure. The four fixators 120, 130, 140, and 150 may be configured to move in diagonal directions 121, 131, 141, and 151 of a surface where the portable terminal is placed. Additionally, the four fixators 120, 130, 140, and 150 may be configured to each move individually, or as individual pairs with two fixators connected together to form a pair, or as a group with the four fixators 120, 130, 140, and 150 all connected together. The fixators may be changed based on the shape of the portable terminal to maintain compatibility with a variety of portable terminals.

Further, the fixators 120, 130, 140, and 150 may be formed of substantially soft materials or elastic materials (e.g., rubber, and the like) relative to the portable terminal. The fixators 120, 130, 140, and 150 formed of the soft materials or the elastic materials may prevent damage to the corners of the portable terminal. A damaged fixator may be individually exchanged when portions of the fixators 120, 130, 140, and 150 are damaged, which may decrease maintenance cost of the apparatus.

The apparatus for mounting the portable terminal may further include motors 122, 132, 142, and 152 configured to move the fixators. In particular, the motors 122, 132, 142, and 152 may be configured to move the fixators 120, 130, 140, and 150 based on a control of the controller 115. As describe above, the motors 122, 132, 142, and 152 may also be configured to operate as two pairs of connected motors, or each pair of connected motors individually, or each motor individually.

The motors 122, 132, 142, and 152 may also be rotated (123, 133, 143 and 153) individually.

Figure 3:
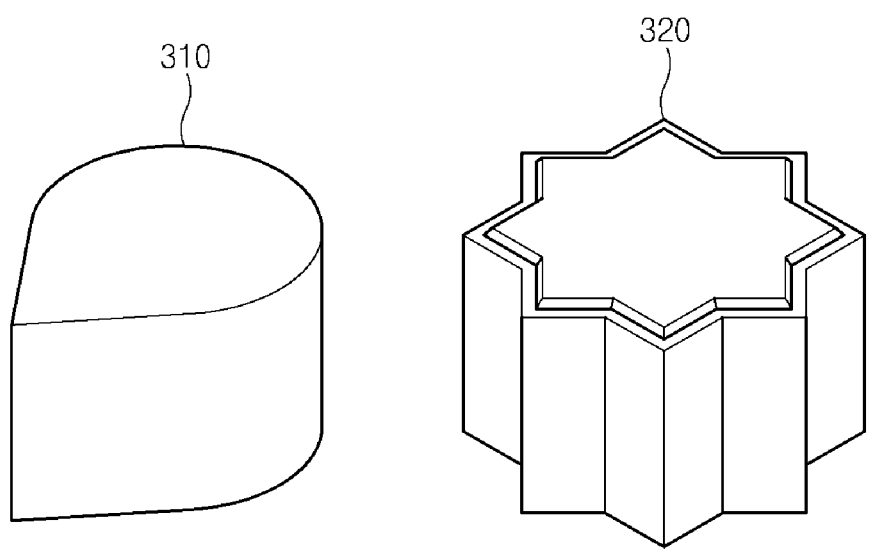
FIG. 3 is an exemplary diagram illustrating another shape of a fixator of an apparatus for mounting a portable terminal according to an exemplary embodiment of the present disclosure.

FIG. 3 is an exemplary diagram illustrating another shape of the fixator according to an exemplary embodiment of the present disclosure. Although the fixators 120, 130, 140, and 150 illustrated in FIGS. 1 and 2 may be a latch shape, the fixators may be formed as various shapes such as a circle shape 310 or a sawtooth shape 320 as illustrated in FIG. 3.

The different shapes may fix a portable terminal even when the corners of the portable terminal are a rounded shape or formed as another shape.

Since the apparatus for mounting the portable terminal may fix the portable terminal by adjacently adhering the fixators to the corners of the portable terminal, the buttons disposed on the portable terminal may be prevented from being unintentionally pressed. Further, the fixators may be configured to automatically move, or a personalization service based on the detection of the corresponding portable terminal may be implemented.

As described above, the apparatus for mounting the portable terminal according to the exemplary embodiment of the present disclosure may mount the portable terminal and may prevent the unintentional pressing of the buttons disposed on a side surface or an upper/lower surface of the portable terminal by fixing the corner portions of the portable terminal by the two pairs of fixators moving in the diagonal direction.

Hereinabove, although the present disclosure has been described with reference to the specific exemplary embodiments thereof, those skilled in the art will appreciate that various modifications, additions and substitutions of the present disclosure are possible without departing from the scope and spirit of the present disclosure. Accordingly, the scope of the present disclosure is not construed as being limited to the described exemplary embodiments but is defined by the appended claims as well as equivalents thereto. Considering the contents as described above, if modifications and alterations of the present disclosure are included in the following claims and a scope equivalent thereto, it is considered that the present disclosure includes these modifications and alterations thereof.

What is claimed is:

1. An apparatus for mounting a portable terminal, comprising:
   a plurality of fixators configured to move in a diagonal direction relative to one surface of a portable terminal and fix corners of the portable terminal; and
   a controller configured to:
      detect the portable terminal;
      execute the movement of the fixators to adhere the fixators to the corners of the portable terminal based on the detection of the portable terminal;
      detect a weight of the portable terminal; and
      detect the portable terminal via near field communication (NFC).

2. The apparatus according to claim 1, wherein the plurality of fixators includes four fixators formed by two pairs of fixators, and wherein a movement of the fixators is selected from the group consisting of: the four fixators each moving individually, as individual pairs with two fixators connected together to form a pair, and as a group with the four fixators all connected together.

3. The apparatus according to claim 1, further comprising:
   a plurality of motors configured to move the fixators based on a control signal from the controller.

4. The apparatus according to claim 1, wherein the fixator has a cross sectional shape of at least one selected from the group consisting of: a circle shape, a quadrangular shape, and a sawtooth shape.

5. The apparatus according to claim 1, wherein the fixator is formed of a substantially soft material relative to the portable terminal, and is configured to be individually exchanged when the fixator is damaged.

6. The apparatus according to claim 1, wherein when an NFC identification (ID) of the portable terminal is registered with the controller in advance, the controller may further be configured to automatically move the fixators to a predetermined position to fix the portable terminal.

7. The apparatus according to claim 1, when the controller is connected to a wireless charging system, the controller is further configured to detect the portable terminal using a portable terminal response to a signal from the wireless charging system.

8. A method for mounting a portable terminal, comprising:
   detecting, by a controller, a portable terminal;
   executing, by the controller, a movement of a plurality of fixators to adhere the fixators to corners of the portable terminal based on the detection of the portable terminal;
   detecting, by the controller, a weight of the portable terminal; and
   detecting, by the controller, the portable terminal via near field communication (NFC).

9. The method of claim 8, wherein the movement of the plurality of fixators is selected from the group consisting of: moving the fixators individually, as individual pairs with two fixators connected together to form a pair, and as a group with the four fixators all connected together.

10. The method of claim 8, further comprising automatically moving, by the controller, the fixators to a predetermined position to fix the portable terminal when an NFC identification (ID) of the portable terminal is registered with the controller in advance.

11. The method of claim 8, further comprising detecting, by the controller, the portable terminal using a portable terminal response to a ping signal from a wireless charging system when the controller is connected to the wireless charging system.

12. A non-transitory computer readable medium containing program instructions executed by a controller, the computer readable medium comprising:
   program instructions that detect a portable terminal;
   program instructions that execute a movement of a plurality of fixators to adhere the fixators to corners of the portable terminal based on the detection of the portable terminal;
   program instructions that detect a weight of the portable terminal; and
   program instructions that detect the portable terminal via near field communication (NFC).

13. The non-transitory computer readable medium of claim 12, wherein the program instructions that execute a movement of the plurality of fixators is selected from the group consisting of: program instructions that move the fixators individually, program instructions that move the fixators as individual pairs with two fixators connected together to form a pair, and program instructions that move the fixators as a group with the four fixators all connected together.

14. The non-transitory computer readable medium of claim 12, further comprising program instructions that automatically move the fixators to a predetermined position to fix the portable terminal when an NFC identification (ID) of the portable terminal is registered with the controller in advance.

15. The non-transitory computer readable medium of claim 12, further comprising program instructions that detect the portable terminal using a portable terminal response to a ping signal from a wireless charging system when the controller is connected to the wireless charging system.

* * * * *